United States Patent [19]
Takahashi et al.

[11] Patent Number: 5,430,834
[45] Date of Patent: Jul. 4, 1995

[54] METHOD AND APPARATUS FOR STORING AND REPRODUCING A CURVE

[75] Inventors: Shingo Takahashi; Aisaku Imanishi, both of Tokyo, Japan

[73] Assignee: Seikosha Co., Ltd., Tokyo, Japan

[21] Appl. No.: 104,259

[22] Filed: Aug. 9, 1993

Related U.S. Application Data

[63] Continuation of Ser. No. 775,651, Oct. 10, 1991, abandoned.

[30] Foreign Application Priority Data

Oct. 17, 1990 [JP] Japan .................................. 2-278099

[51] Int. Cl.⁶ .............................................. G06F 15/62
[52] U.S. Cl. .................................. 395/142; 395/141; 395/143
[58] Field of Search ............................. 395/141–144, 395/150, 151, 155; 382/56; 358/133

[56] References Cited

U.S. PATENT DOCUMENTS

| | | | |
|---|---|---|---|
| 4,620,287 | 10/1986 | Yam | 395/142 |
| 4,688,182 | 8/1987 | Schrieber | 395/142 |
| 5,103,306 | 4/1992 | Weiman et al. | 358/133 |
| 5,133,052 | 7/1992 | Bier et al. | 395/155 |
| 5,214,754 | 5/1993 | Okamoto et al. | 395/142 |
| 5,233,671 | 8/1993 | Murayama | 382/56 |

FOREIGN PATENT DOCUMENTS

| | | | |
|---|---|---|---|
| 0395482 | 10/1990 | European Pat. Off. | G06F 15/72 |
| 3700740 | 7/1987 | Germany | G06F 15/353 |
| 2185606 | 7/1987 | United Kingdom | G06F 7/544 |
| 2203613 | 10/1988 | United Kingdom | G06F 3/14 |

OTHER PUBLICATIONS

Computers & Graphics, vol. 10, No. 1, 1986, New York, USA, Martinelli and Tani 'fast hardware graphic generators of curve families'.

*Primary Examiner*—Almis Jankus
*Attorney, Agent, or Firm*—Jordan and Hamburg

[57] ABSTRACT

A method for approximately representing a first curve having anchor points and a control point, wherein the first curve is subdivided into a plurality of segments and an approximate curve is constructed by joining the points corresponding to the ends of the segments with straight lines. The number of segments is a function of the difference between the lengths of lines joining the anchor points and control point, and a line joining the anchor points.

16 Claims, 12 Drawing Sheets

| Points | ( x, y ) | ΔL | Number of Subdivisions N | Step |
|---|---|---|---|---|
| PA | 0, 0 | 169.1 | 32 | 8 |
| PB | 50, 120 | | | |
| PC | 80, 100 | | | |
| PD | 100, 0 | | | |
| PA | 0, 0 | 64.6 | 16 | 16 |
| PB | 50, 60 | | | |
| PC | 80, 50 | | | |
| PD | 100, 0 | | | |
| PA | 0, 0 | 21.7 | 8 | 32 |
| PB | 50, 30 | | | |
| PC | 80, 25 | | | |
| PD | 100, 0 | | | |
| PA | 0, 0 | 6.9 | 4 | 64 |
| PB | 50, 15 | | | |
| PC | 80, 12.5 | | | |
| PD | 100, 0 | | | |
| PA | 0, 0 | 1 | 1 | 256 |
| PB | 50, 0 | | | |
| PC | 80, 0 | | | |
| PD | 100, 0 | | | |

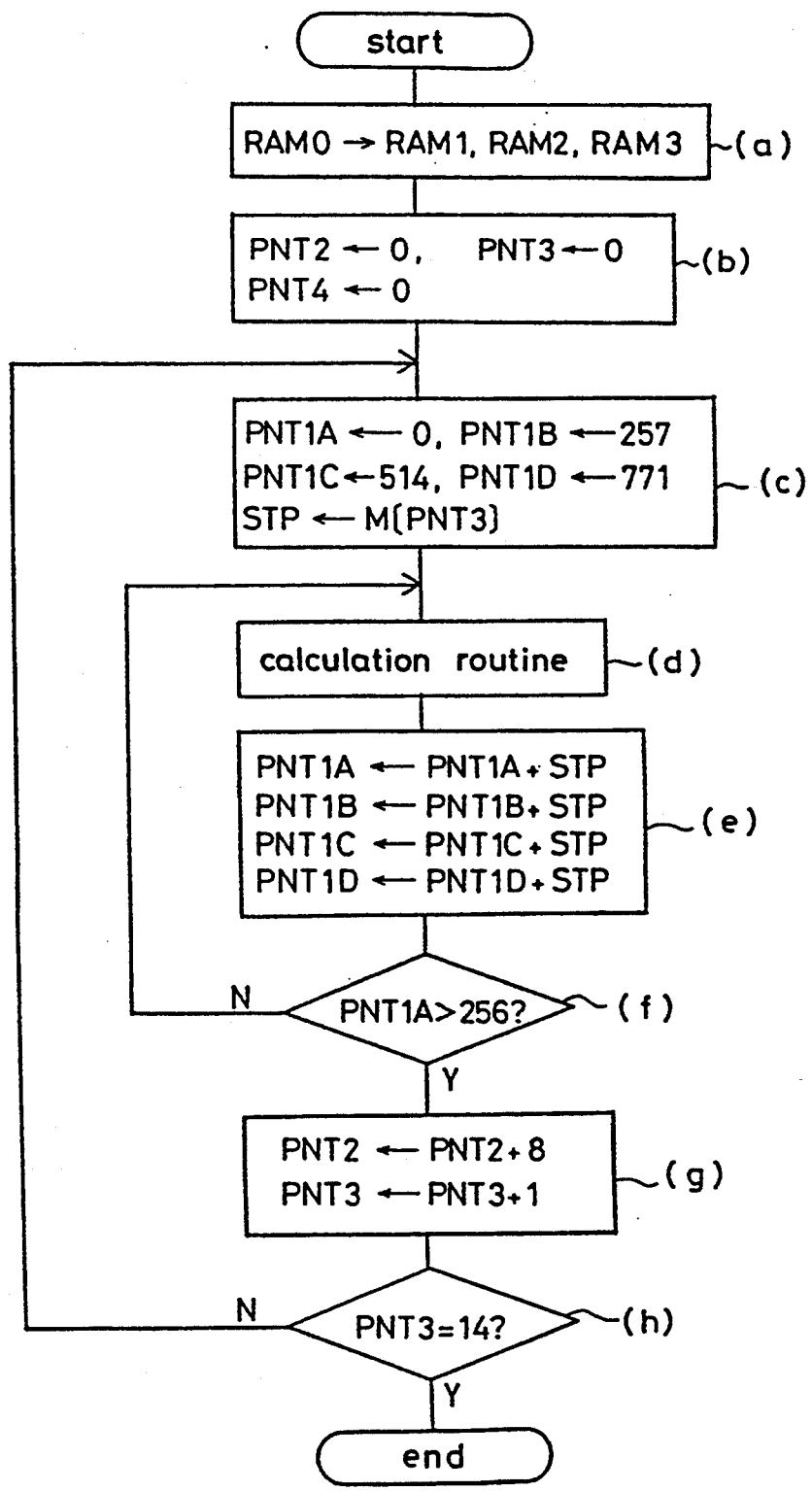

FIG. 5

| n | t | WA | WB | WC | WD |
|---|---|---|---|---|---|
| 0 | 0/256 | WA0 | WB0 | WC0 | WD0 |
| 1 | 1/256 | WA1 | WB1 | WC1 | WD1 |
| 2 | 2/256 | WA2 | WB2 | WC2 | WD2 |
| ⋮ | ⋮ | ⋮ | ⋮ | ⋮ | ⋮ |
| 255 | 255/256 | WA255 | WB255 | WC255 | WD255 |
| 256 | 256/256 | WA256 | WB256 | WC256 | WD256 |

FIG.6

| Address | Data |
|---|---|
| 0 0 0 0 | W A 0 |
| 0 0 0 1 | W A 1 |
| . | . |
| . | . |
| 0 2 5 6 | W A 256 |
| 0 2 5 7 | W B 0 |
| 0 2 5 8 | W B 1 |
| . | . |
| . | . |
| 0 5 1 3 | W B 256 |
| 0 5 1 4 | W C 0 |
| 0 5 1 5 | W C 1 |
| . | . |
| . | . |
| 0 7 7 0 | W C 256 |
| 0 7 7 1 | W D 0 |
| 0 7 7 2 | W D 1 |
| . | . |
| . | . |
| 1 0 2 7 | W D 256 |

F I G. 7

| Address | Data |
|---------|------|
| 0 0 0 0 | P A X 0 |
| 0 0 0 1 | P B X 0 |
| 0 0 0 2 | P C X 0 |
| 0 0 0 3 | P D X 0 |
| 0 0 0 4 | P A Y 0 |
| 0 0 0 5 | P B Y 0 |
| 0 0 0 6 | P C Y 0 |
| 0 0 0 7 | P D Y 0 |
| 0 0 0 8 | P A X 1 |
| 0 0 0 9 | P B X 1 |
| 0 0 1 0 | P C X 1 |
| 0 0 1 1 | P D X 1 |
| 0 0 1 2 | P A Y 1 |
| 0 0 1 3 | P B Y 1 |
| 0 0 1 4 | P C Y 1 |
| 0 0 1 5 | P D Y 1 |
| 0 0 1 6 | P A X 2 |
| ⋮ | ⋮ |

FIG.8

| Address | Data |
|---------|------|
| 0 0 0 0 | $\Delta n1$ |
| 0 0 0 1 | $\Delta n2$ |
| 0 0 0 2 | $\Delta n3$ |
| 0 0 0 3 | $\Delta n4$ |
| · | · |
| · | · |
| · | · |

FIG. 9

| Address | Data |
|---------|------|
| 0 0 0 0 | X 0,0 |
| 0 0 0 1 | Y 0,0 |
| 0 0 0 2 | X 0,1 |
| 0 0 0 3 | Y 0,1 |
| ⋮ | ⋮ |
| 0 0 3 1 | X 0,16 |
| 0 0 3 2 | Y 0,16 |
| 0 0 3 3 | X 1,0 |
| 0 0 3 4 | Y 1,0 |
| 0 0 3 5 | X 1,1 |
| 0 0 3 6 | Y 1,1 |
| ⋮ | ⋮ |
| 0 0 9 6 | X 1,32 |
| 0 0 9 7 | Y 1,32 |
| 0 0 9 8 | X 2,0 |
| 0 0 9 9 | Y 2,0 |
| ⋮ | ⋮ |

FIG.11

| Points | (x、y) | ΔL | Number of Subdivisions N | Step |
|---|---|---|---|---|
| P A | 0, 0 | 169.1 | 32 | 8 |
| P B | 50, 120 | | | |
| P C | 80, 100 | | | |
| P D | 100, 0 | | | |
| P A | 0, 0 | 64.6 | 16 | 16 |
| P B | 50, 60 | | | |
| P C | 80, 50 | | | |
| P D | 100, 0 | | | |
| P A | 0, 0 | 21.7 | 8 | 32 |
| P B | 50, 30 | | | |
| P C | 80, 25 | | | |
| P D | 100, 0 | | | |
| P A | 0, 0 | 6.9 | 4 | 64 |
| P B | 50, 15 | | | |
| P C | 80, 12.5 | | | |
| P D | 100, 0 | | | |
| P A | 0, 0 | 1 | 1 | 256 |
| P B | 50, 0 | | | |
| P C | 80, 0 | | | |
| P D | 100, 0 | | | |

METHOD AND APPARATUS FOR STORING AND REPRODUCING A CURVE

This application is a continuation of application Ser. No. 07/775,651 filed Oct. 10, 1991, now abandoned.

RELATED APPLICATIONS

This application is related to co-pending U.S. patent application Ser. No. 07/775,660 and U.S. Pat. No. 5,341,317, both having the same common inventors as this instant application, both being filed concurrently herewith, the disclosures of both being incorporated herein by reference.

FIELD OF THE INVENTION

The present invention relates to a curvilinear approximation method for an outline font.

BACKGROUND OF THE INVENTION

In recent years, outline fonts have been increasingly used for expressing curves of a character or graph.

In the actual depiction of a curve using an outline font in the prior art, the curve is sequentially subdivided until adjacent subdividing points are degenerated to the same point. The curve is approximately expressed by sequentially connecting the respective subdividing points with straight lines.

If a curvature of a curve to be expressed is small, it is possible to provide a sufficient quality of expression even though the number of subdivisions is not so increased.

In the conventional methods, however, the subdivisions are effected irrespective of the curvature. More subdivisions than required will be performed in some cases. This results in the problem that generation of an outline font requires a large amount of time.

SUMMARY OF THE INVENTION

Accordingly, it is an object of this invention to reduce the time needed for generating an outline font while obtaining the optimum number of subdivisions in accordance with a curve to be expressed.

According to the present invention, a first curvilinear approximation method is provided for approximately expressing a curve expressed by use of two anchor points and at least one control point, comprising the steps of: subdividing the curve into a plurality of parts, and connecting adjacent subdividing points with a straight line. The first method of this invention comprises obtaining the difference between the value corresponding to lengths of line segments sequentially connecting the one anchor point to the control point and another anchor point with straight lines and the value corresponding to the length of line segments connecting the anchor points to each other with a straight line, and obtaining the number of subdivisions of the curve on the basis of the value corresponding to said difference.

A second curvilinear approximation method for approximately expressing a curve expressed by use of two anchor points and at least one control point, comprises the steps of subdividing the curve into a plurality of parts; and connecting adjacent subdividing points with a straight line. The second method of the invention comprises obtaining the number of subdivisions of the curve on the basis of areas of parts surrounded by straight lines for connecting the one anchor point, the control point and another anchor point.

BRIEF DESCRIPTION OF THE DRAWINGS

FIG. 5 is a conceptual diagram of a data table;

FIGS. 6 to 9 are address maps of respective data stored in RAMs;

FIG. 11 is a diagram showing a specific example where the number of subdivisions is obtained by the first method.

DESCRIPTION OF THE PREFERRED EMBODIMENTS

Figure 1:
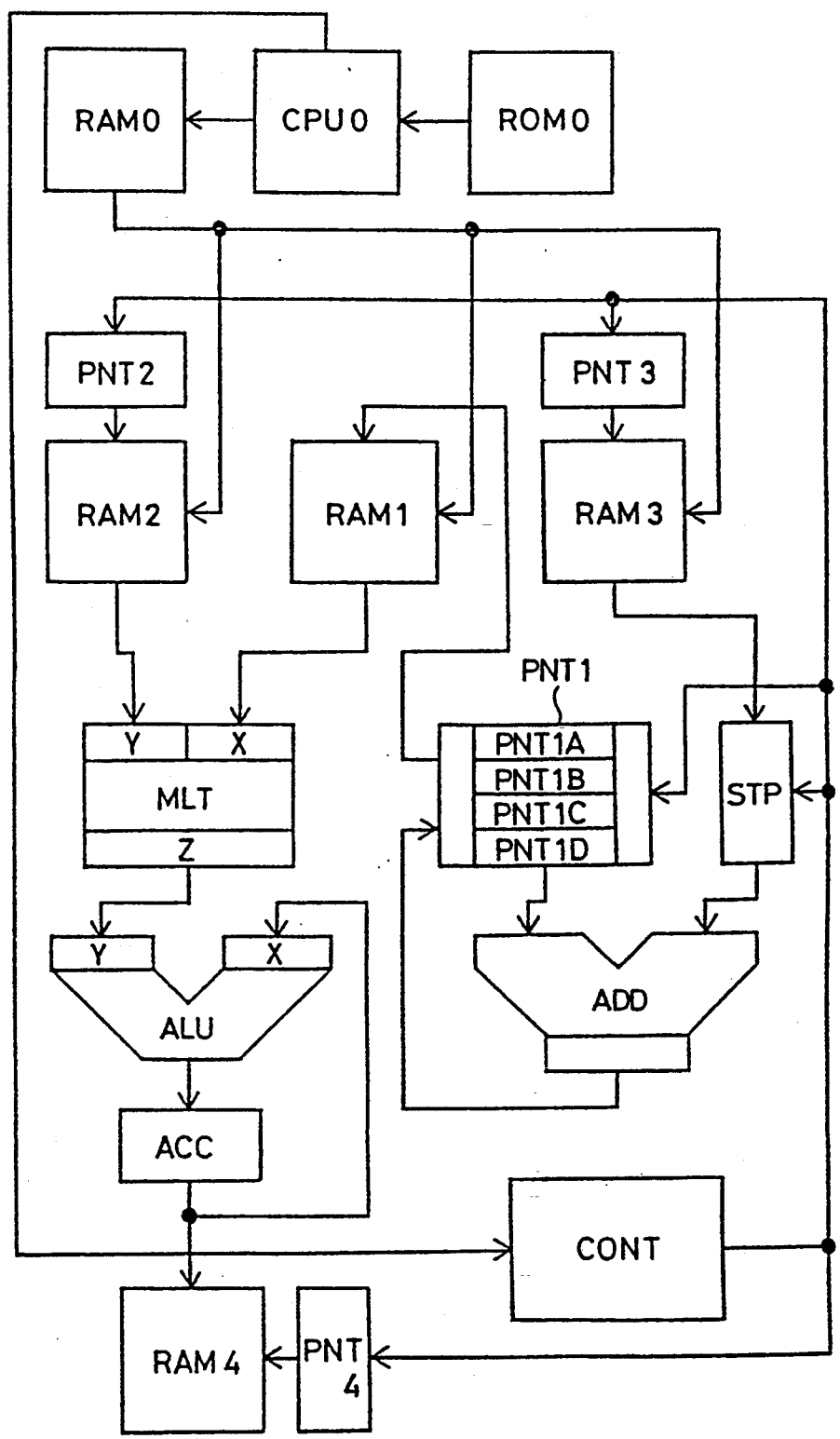
FIG. 1 is a block diagram.

An embodiment of the present invention will hereinafter be described with reference to the accompanying drawings.

In the following embodiment, so far as the conditions are not particularly prescribed, a cubic curve such as a cubic Bezier curve and a cubic Spline curve is used for expressing an outline font. These curves are parametrically expressed as follows:

$$Q = WA \times PA + WB \times PB + WC \times PC + WD \times PD \quad (1)$$

where WA, WB, WC and WD are the functions expressed by using a parameter "t". Take the cubic Bezier curve, for example, these functions are given by:

$$WA = (1 - t)^3 \quad (2a)$$
$$WB = 3t \cdot (1 - t)^2 \quad (2b)$$
$$WC = 3t^2 \cdot (1 - t) \quad (2c)$$
$$WD = t^3 \quad (2d)$$
$$(0 \leq t \leq 1)$$

PA, PB, PC and PD are the coordinates on an X-Y plane which determine a curvilinear configuration. These coordinates are expressed such as:

PA (x, y): anchor point
PB (x, y): control point
PC (x, y): control point
PD (x, y): anchor point Now, considering the formula (1), the parameter functions WA, WB, WC and WD are, as expressed in, e.g., the formulae (2a) through (2d), uniquely determined depending on types of the cubic curves. PA, PB, PC and PD are predetermined in accordance with the curvilinear configuration. Hence, as shown in FIG. 5, the parameter functions WA to WD are precalculated corresponding to values of the respective subdivided parameters "t". Results of the calculations can be stored in a data table. The coordinates (x, y) of PA, PB, PC and PD are also storable in the data table. The respective data are thus stored in the data table. Hardware calculations based on the formula (1) are effected using a multiplier and an adder, thereby enabling generating the curvilinear data at a high speed. More specifically, as shown in FIG. 5, the parameter "t" ($0 \leq t \leq 1$) is subdivided by 256. The parameter functions WA through WD are obtained per "t". Then, the hardware calculations based on the formula (1) are carried out. As a result, the coordinates at a total of 257 points on the curve can be obtained. These coordinates are sequentially connected with straight lines, whereby the curve can approximately be expressed.

In the example given above, the curve is approximately expressed by subdividing the curve by 256. In the case of a curve having a small curvature, an approximate curve exhibiting a sufficient accuracy is expressible even if the curve does not undergo such a large number of subdivisions. This will be explained with reference to FIGS. 3, 4(A) and 4(B). The curve depicted in FIG. 3 consists of a total of 14 segmental curves C1 through C14. Each of the segmental curves C1 through C14 is expressed by the formula (1), using different anchor and control points. FIGS. 4(A) and 4(B) respectively show the segmental curves C1 and C2 of FIG. 3. The segmental curve C1 is, as illustrated in FIG. 4(A), subdivided by 16. The segmental curve C1 is approximately expressed by 17 points Q0,0 to Q0,16 provided thereon. In the example of FIG. 5, n is incremented stepwise by sixteens (256/16=16) such as n=0, 16, 32 . . . , 256. The calculations may be effected on only these values of n. The segmental curve C2 is, as illustrated in FIG. 4(B), subdivided by 32. The segmental curve C2 is approximately expressed by 33 points Q1,0 to Q1,32 provided thereon. In the example of FIG. 5, n is incremented stepwise by eights (256/32=8) such as n=0, 8, 16, . . . , 256. The calculations may be effected on only these values of n. In this manner, a proper number of divisions is previously obtained corresponding to the curves. Only the calculations corresponding thereto are carried out, resulting in a speed-up of the hardware calculations. A specific method for obtaining the number of subdivisions will be discussed later.

Referring to the above-mentioned, the curvilinear approximation method shown in FIG. 3 will hereinafter be explained.

Figure 3:
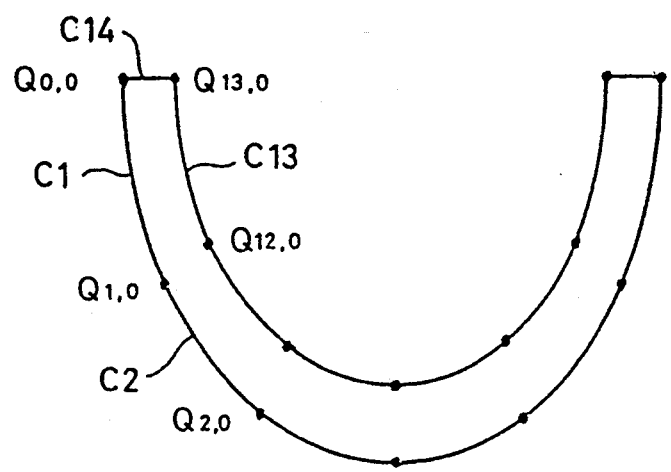
FIGS. 3, 4(A) and 4(B) are diagrams to aid in the explanation of an outline font.
Figures 4A, 4B:
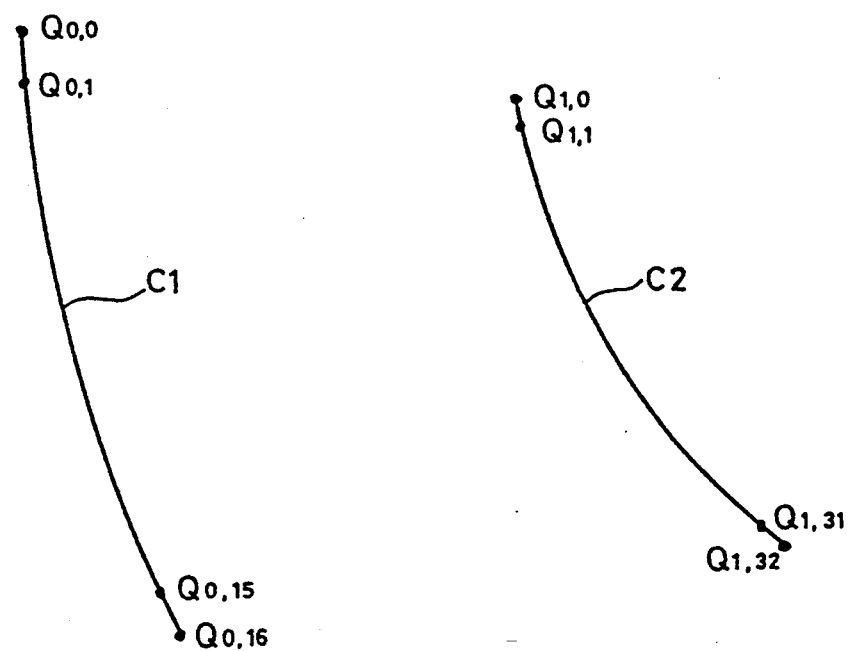

FIG. 1 is a block diagram showing hardware employed for approximately expressing the curve of FIG. 3.

A microprocessor CPU0 controls the hardware as a whole.

A read-only memory ROM0 stores programs used for a variety of processes performed by the microprocessor CPU0.

A random access memory RAM0 prestores the data which will be discussed later. Stored in RAM0 are data on a variety of curves such as the cubic Spline curve in addition to the cubic Bezier curve. The data are, as the necessity arises, transferred to RAM1, RAM2 and RAM3 which will hereinafter be described.

A random access memory RAM1 stores the values of the parameter functions WA, WB, WC and WD shown in FIG. 5. Stored in RAM1 in the manner shown in FIG. 6 are data WA0–WA256, WB0–WB256, WC0–WC256 and WD0–WD256 which are transmitted from RAM0.

A random access memory RAM2 stores coordinate data of the anchor points PA, PD and the control points PB, PC for each of the segmental curves C1–C14 shown in FIG. 3. The coordinate data are transferred from RAM0 and stored, as illustrated in FIG. 7, in RAM2. Referring to FIG. 7, PAX0–PDX0 represent x-coordinates at the anchor and control points on the segmental curve C1. PAY0–PDY0 indicate y-coordinates at the anchor and control point. PAX1–PDX1 designate x-coordinates at the anchor and control points on the segmental curve C2. PAY1–PDY1 are y-coordinates at the anchor and control points.

For each of the segmental curves C1–C14, a random access memory RAM3 prestores the data corresponding to the number of subdivisions of the individual segmental curves C1–C14 shown in FIG. 3. The data corresponding to the number of subdivisions may include the subdividing number itself or the step-number n shown in FIG. 5. In this embodiment, the random access memory RAM3 stores, as illustrated in FIG. 8, the step-number n, i.e., an n-increment $\Delta n$. Referring to FIG. 8, $\Delta n1$, $\Delta n2$, . . . represent the step-numbers stored corresponding to the segmental curves C1, C2, . . . of FIG. 3. Data $\Delta n1$, $\Delta n2$, . . . are transferred from RAM0 and stored, as illustrated in FIG. 8, in RAM3.

A random access memory RAM4 stores results of the hardware calculations effected in accordance with the formula (1), viz., data Q (x, y) about the coordinates on the segmental curves C1–C14. The coordinate data Q (x, y) are, as depicted in FIG. 9, stored in RAM4. Referring to FIG. 9, data X0,0–X0,16 and Y0,0–Y0,16 are x- and y-coordinates at points Q0,0–Q0,16 on the segmental curve C1 of FIG. 4(A). Data X1,0–X1,32 and Y1,0–Y1,32 are x- and y-coordinates at points Q1,0–Q1,32 on the segmental curve C2 of FIG. 4(B).

An address pointer PNT1 of RAM1 is composed of independent address sub-pointers PNT1A, PNT1B, PNT1C and PNT1D. The sub-pointers PNT1A, PNT1B, PNT1C and PNT1D point to addresses of the data WA0–WA256, WB0–WB256, WC0–WC256 and WD0–WD256 (see FIG. 6) respectively.

An address pointer PNT2 of RAM2 is intended to point to addresses of the respective coordinate data (see FIG. 7) at the anchor and control points, the data being stored in RAM2.

An address pointer PNT3 of RAM3 serves to point to addresses of the step-numbers $\Delta n1$, $\Delta n2$, . . . (see FIG. 8) which are stored in RAM3.

An address pointer PNT4 of RAM4 points to addresses of coordinate data X0,0–X0,16 and Y0,0–Y0,16 (see FIG. 9) which are obtained by the hardware calculations.

A latch circuit STP acts to latch the step-numbers n, n2, . . . (see FIG. 8) which are stored in RAM3.

An adder circuit ADD adds the value of the address sub-pointer (PNT1A, PNT1B, PNT1C or PNT1D) that is now being selected to the value of the latch circuit STP. The adder circuit ADD sends the result of this addition to the address sub-pointer that is now being selected. To be specific, the adder circuit ADD increments the values of the address sub-pointers by the step-numbers n1, n2, . . . which are being latched by the latch circuit STP.

A multiplier circuit MLT multiplies the data stored in RAM1 shown in FIG. 6 by the data stored in RAM2 of FIG. 7. That is, the circuit MLT performs the multiplication (e.g., WA×PA) in formula (1).

An arithmetic logical circuit ALU adds the multiplied value given by the multiplier circuit MLT to a value in an accumulator which will be stated later.

The accumulator ACC holds the arithmetic result of the arithmetic logical circuit ALU and transmits it to one input of this circuit ALU. Namely, the arithmetic logical circuit ALU and the accumulator ACC cooperate to perform the addition in formula (1).

A control circuit CONT controls the arithmetic process upon receiving a command from the microprocessor CPU0. The control circuit CONT incorporates a microprogram relative to the above-described arithmetic processes.

Referring to the flowcharts of FIGS. 2(A), 2(B) and 2(C), an operation of the circuit depicted in FIG. 1 will be explained.

Initialization is at first effected on the basis of a signal from the microprocessor CPU0.

(a): Transmitted from RAM0 to RAM1 are the data corresponding to respective "t" of the parameter functions WA, WB, WC and WD shown in FIG. 5. The data are, as shown in FIG. 6, stored in RAM1. Transmitted from RAM0 to RAM2 are the data of coordinates at the anchor and control points for each of the segmental curves C1–C14 of FIG. 3. The coordinate data are then, as shown in FIG. 7, stored in RAM2. Transmitted from RAM0 to RAM3 are the step-number data $\Delta n1$, $\Delta n2$, . . . for each of the segmental curves C1–C14 corresponding to the number of subdivisions of the respective segmental curves C1–C14 shown in FIG. 3. The step-number date are, as shown in FIG. 8, stored in RAM3.

(b): The address pointers PNT2, PNT3 and PNT4 are set respectively to "0". As a result, the addresses in which the data PAX0 of FIG. 7, the data $\Delta n1$ of FIG. 8 and the data X0,0 of FIG. 9 are stored, are pointed to.

The initialization has thus come to an end. Next, the arithmetic operation for the segmental curve C1 depicted in FIGS. 3 and 4(A) is executed.

(c): "0" is set to the address sub-pointer PNT1A. "257" is set to the address sub-pointer PNT1B. "514" is set to the address sub-pointer PNT1C. "771" is set to the address sub-pointer PNT1D. As illustrated in FIG. 6, the addresses in which the data WA0, WB0, WC0 and WD0 are stored are pointed to. Latched by the latch circuit STP is data M [PNT3] stored in an address "0000" of RAM3, the address being pointed by the address pointer PNT3. Latched is the step-number $\Delta n1$ (the step-number "16" corresponding to the number of subdivisions of the segmental curve C1 of FIG. 4(A)) shown in FIG. 8.

(d): The following is a way of performing the calculation routine shown in FIG. 2(B).

To obtain the x-coordinates at the point Q0,0 shown in FIG. 4(A), "WA×PA+WB×PB+WC×PC+WD×PD" in the formula (1) is performed in the following manner.

(d1): the accumulator ACC is cleared, and "0" is set.

(d2): Transferred to an input "X" of the multiplier circuit MLT is data M [PNT1A], i.e., . "WA0" (see FIG. 6) stored in an address "0000" of RAM1, this address being pointed by the address sub-pointer PNT1A. Transferred to an input "Y" of the multiplier circuit MLT is data M [PNT2], viz., "PAX0" (see FIG. 7) stored in the address "0000" of RAM2, this address being pointed by the address pointer PNT2.

(d3): The multiplication and addition of FIG. 2(C) are carried out as follows.

(d101): Outputted to "Z" of the multiplier circuit MLT is a product, given by "WA0×PAX0", of a value "WA0" of the input "X" of the multiplier circuit MLT and a value "PAX0" of the input "Y" thereof. That is, the calculation corresponding to "WA×PA" in the formula (1) is effected. A result of this calculation is sent to an input "Y" of the arithmetic logical circuit ALU. On the other hand, the data "0" of the accumulator ACC is transferred to an input "X" of the arithmetic logical circuit ALU.

(d102): The value of the input "X" of the arithmetic logical circuit ALU is added to a value of the input "Y" thereof. The result of this addition is sent to the accumulator ACC. As a result, the value given by "WA0×PAX0" is held in the accumulator ACC.

(d103): "1" is added to a value of the address pointer PNT2, whereby the pointer value becomes "0001".

(d4): Transferred to the input "X" of the multiplier circuit MLT is data M [PNT1B], i.e., "WB0" (see FIG. 6) stored in an address "0257" of RAM1, this address being pointed by the address sub-pointer PNT1B. Transferred to the input "Y" of the multiplier circuit MLT is data M [PNT2], viz. , "PBX0" (see FIG. 7) stored in an address "0001" of RAM2, this address being pointed by the address pointer PNT2.

(d5): The multiplication and addition of FIG. 2(C) are performed. The fundamental operations are the same as those described in the item (d3). The multiplier circuit MLT obtains the product of "WB0" shown in FIG. 6 and "PBX0" shown in FIG. 7, the product being given by "WB0×PBX0" corresponding to "WB×PB" shown in the formula (1). The arithmetic logical circuit ALU adds a value of "WB0×PBX0" to the value held in the accumulator ACC, of "WA0×PAX0". Held in the accumulator ACC is the result of the calculation such as "WA0×PAX0+WB0×PBX0". Namely, the calculation corresponding to "WA×PA+WB×PB" in the formula (1) is performed.

(d6): Transferred to the input "X" of the multiplier circuit MLT is data M [PNT1C], i.e., "WC0" (see FIG. 6) stored in an address "0514" of RAM1, this address being pointed by the address sub-pointer PNT1C. Transferred to the input "Y" of the multiplier circuit MLT is data M [PNT2], i.e., . "PCX0" (see FIG. 7) stored in an address "0002" of RAM2, this address being pointed by the address pointer PNT2.

(d7): The multiplication and addition of FIG. 2(C) are carried out. The fundamental operations are the same as those explained in (d3). The multiplier circuit MLT obtains the product of "WC0" shown in FIG. 6 and "PCX0" shown in FIG. 7, this product being given by "WC0×PCX0" corresponding to "WC×PC" in the formula (1). The arithmetic logical circuit ALU adds the result of this calculation of "WC0×PCX0" to the value held in the accumulator ACC, of "WA0×PAX0+WB0×PBX0". Held in the accumulator ACC is the result of this calculation: "WA0×PAX0+WB0×PBX0+WC0×PCX0". That is, there is herein effected the calculation corresponding to WA×PA+WB×PB+WC×PC" in the formula (1).

(d8): Transferred to the input "X" of the multiplier circuit MLT is data M [PNT1D], viz., "WD0" (see FIG. 6) stored in an address "0771" of RAM1, this address being pointed by the address sub-pointer PNT1D. Transferred to the input "Y" of the multiplier circuit MLT is data M [PNT2], i.e., . "PDX0" (see FIG. 7) stored in an address "0003" of RAM2, this address being pointed by the address pointer PNT2.

(d9): The multiplication and addition of FIG. 2(C) are effected. The fundamental operations are the same as those described in the item (d3). The multiplier circuit MLT obtains the product of "WD0" shown in FIG. 6 and "PDX0" shown in FIG. 7, this product being given by "WD0×PDX0" corresponding to "WD×PD" in the formula (1). The arithmetic logical circuit ALU adds the result of this calculation of "WD0×PDX0" to the value held in the accumulator ACC, of "WA0×PAX0+WB0×PBX0+WC0×PCX0." Held in the accumulator ACC is the result of this calculation: "WA0×PAX0+WB0×PBX0+WC0×PCX0+WD0×PDX0". Namely, the calculation corresponding to "WA×PA+WB×PB+WC×PC+WD×PD" is performed.

(d10): The x-coordinates at the point Q0,0 shown in FIG. 4(A) are calculated in the manner discussed above. The calculation results held in the accumulator ACC are stored in the address "0000" of RAM4 which is pointed by the address pointer PNT4. The stored data M [PNT4] is expressed as "X0,0" in FIG. 9.

(d11): "1" is added to the value of the address pointer PNT4, whereby the pointer value becomes "0001".

(d12)–(d21): Next, for obtaining y-coordinates at the point Q0,0 shown in FIG. 4(A), as in the manner of (d1) through (d10), the processes of (d12)–(d21) shown in FIG. 2(B) are carried out. Stored in the address "0001" of RAM4 that is pointed by the address pointer PNT4 is the arithmetic result obtained by "WA0×PAY0+WB0×PBY0+WC0×PCY0+WD0×PDY0". The thus stored date M [PNT4] is expressed as "Y0,0" in FIG. 9.

(d22): "1" is added to the value of the address pointer PNT4, as a result of which the pointer value becomes "0002".

(d23): "8" is subtracted from the value of the address pointer PNT2, whereby the pointer value becomes "0000".

Figure 2:
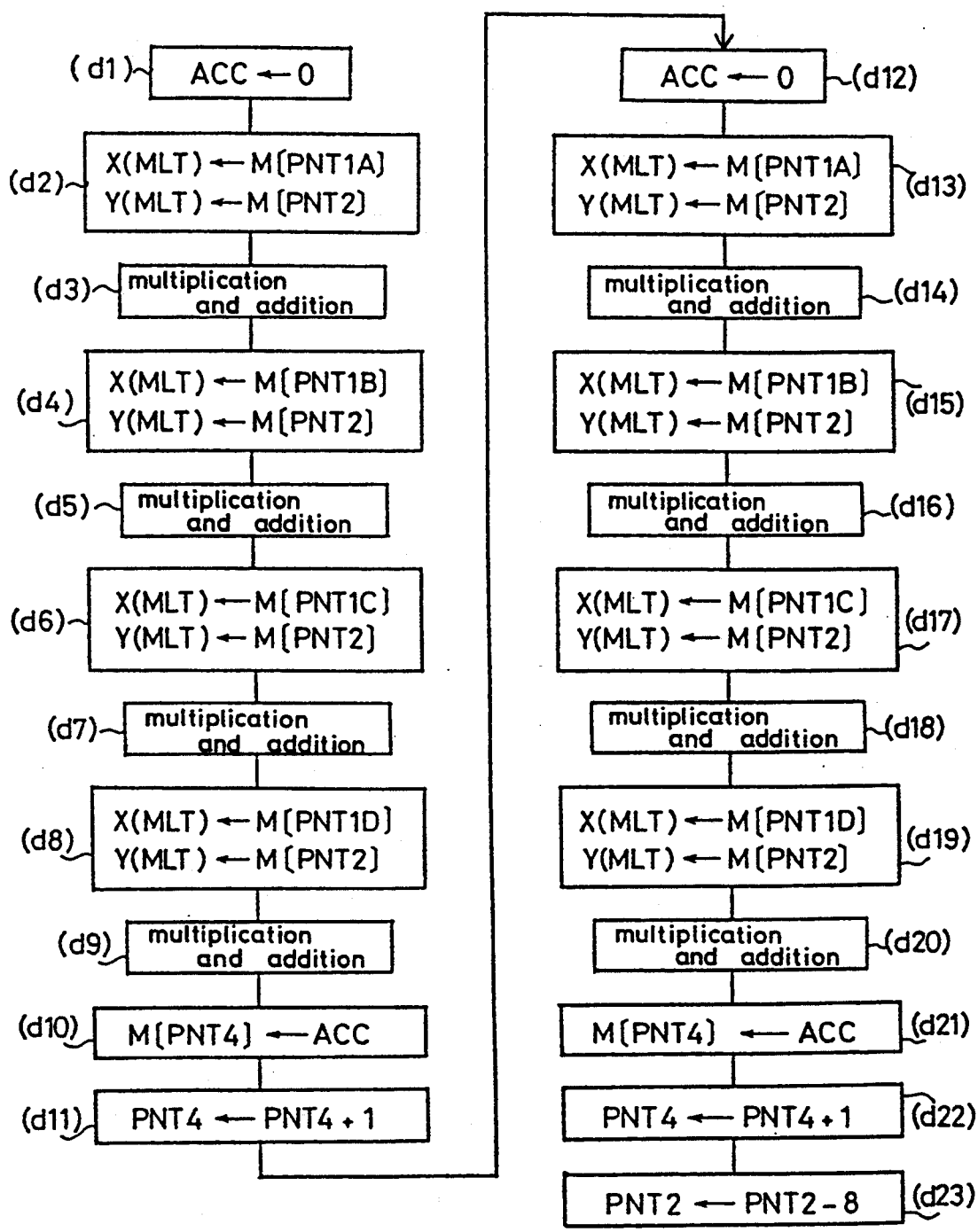
FIGS. 2(A), 2(B) and 2(C) are flowcharts showing operations relative to FIG. 1.
Figure 2:
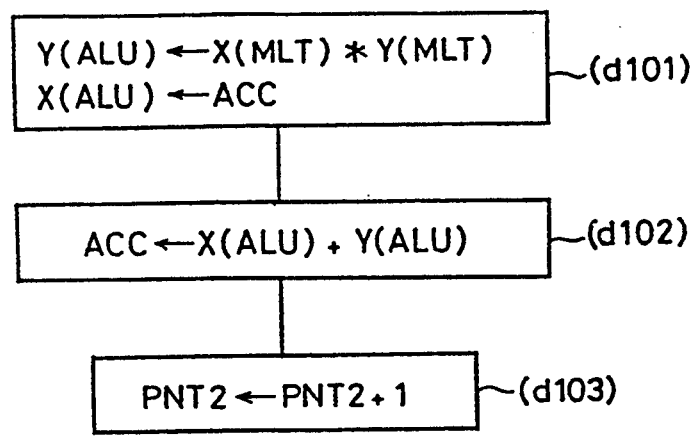

The calculation routine shown in FIG. 2(A) is thus finished The x-coordinates "X0,0" and y-coordinates "Y0,0" at the point Q0,0 of FIG. 4(A) are stored in RAM4 (see FIG. 9).

(e): Added to each of the values of the address sub-pointers PNT1A, PNT1B, PNT1C and PNT1D is the step-number Δn1 (the step-number "16" corresponding to the number subdivisions of the segmental curve C1 of FIG. 4(A)), this step-number being latched by the latch circuit STP. The pointer values of the address sub-pointers PNT1A, PNT1B, PNT1C and PNT1D are "16", "273" (257+16), "530" (514+16), "787" (771+16), respectively.

(f): Whether or not the value of the address sub-pointer PNT1A is larger than "256" is determined.

The present value of the address sub-pointer PNT1A is "0016". Therefore, the process moves to a calculation routine (d). The same process as that explained in the item (d) is carried out. Consequently, the x-coordinates "X0,1" and y-coordinates "Y0,1" at the point Q0,1 of FIG. 4(A) are stored in RAM4 (see FIG. 9). As the specific data, "X0,1" is "WA16×PAX0+WB16×PBX0+WC16×PCX0+WD16×PDX0". "Y0,1" is "WA16×PAY0+WB16×PBY0+WC16×PCY0+WD16×PDY0" (see FIGS. 6 and 7).

The same process continues in this manner until the value of the address sub-pointer PNT1A exceeds "256". Stored sequentially in RAM4 are x-coordinates "X0,0"–"X0,16" and y-coordinates "Y0,0"–"Y0,16" at the points Q0,0–Q0,16 shown in FIG. 4(A) (see FIG. 9).

(g): When the value of the address sub-pointer PNT1A becomes greater than "256" the following process is effected. "8" is added to the value of the address pointer PNT2, as a consequence of which the pointer value becomes "0008" (see FIG. 7). "1" is added to the value of the address pointer PNT3, whereby the pointer value becomes "0001" (see FIG. 8).

Thus, the process associated with the segmental curve C1 shown in FIGS. 3 and 4(A) are finished.

(h): Whether or not the value of the address pointer PNT3 comes to "14" is determined. This value "14" corresponds to the number of subdivisions of the segmental curve of FIG. 3. This value is properly selected for each segmental curve.

The present value of the address pointer PNT3 is "0001". The process moves to a calculation routine (c). The same processes as those stated in the items (c) to (g) are performed. Stored sequentially in RAM4 are x-coordinates "X1,0" "X1,32" and y-coordinates "Y1,0-"–"Y1,32" at points Q1,0–Q1,32 shown in FIG. 4(B) (see FIG. 9).

In this manner, the same processes are effected with respect to the segmental curves C1–C14 of FIG. 3 until the value of the address pointer PNT3 becomes "14". When the value of the address pointer PNT3 has come to "14", it is determined that the processes for the segmental curves C1–C14 of FIG. 3 have been finished.

As discussed above, the number of subdivisions of each segmental curve can adequately be selected depending on its curvature. Selecting the optimum number of subdivisions of each segmental curve enables a speed-up of the hardware calculations. In general, if the curvature is small, an accurately-expressed approximate curve can be obtained even with a small number of subdivisions.

The following is a description of a method for obtaining the optimum number of subdivisions of the segmental curve.

To start with, a first method will be explained referring to FIG. 10.

Figure 10:
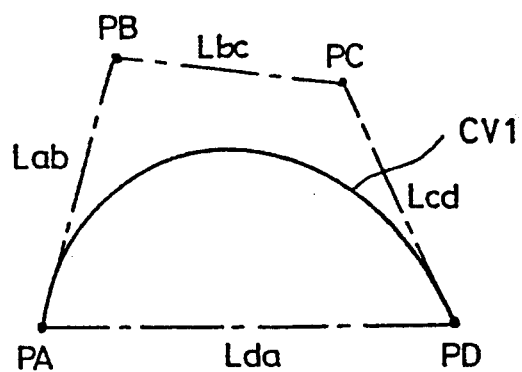
FIG. 10 is a diagram to aid in the explanation of a first method of obtaining the number of subdivisions of a segmental curve.

In FIG. 10, the symbols PA and PD represent anchor points of the segmental curve C1, while PB and PC denote control points thereof. Lab, Lbc, Lcd and Lda are lengths of line segments connecting PA to PB, PB to PC, PC to PD and PD to PA. Generally, the lengths of the line segments Lab and Lcd increase with a larger curvature of a segment curve CV1. Hence, the optimum number "N" of subdivisions of the segmental curve Cv1 can be obtained by the following estimating expressions.

$$\Delta L = (Lab + Lbc + Lcd - Lda) + 1 \quad (3)$$

$$N = 2^{\{log(a) \Delta L\}} \quad (4)$$

$2 \leq a \leq 8$ ("a" is the base)

Note that the base "a" is properly selected according to the approximate accuracy of the curve. The subdividing number "N" in the expression (4), is selected so as not to exceed the number of subdivisions ("256" in the example of FIG. 6) in the data table.

FIG. 11 exemplifies the numbers of subdivisions that are given by the above-described estimating expressions. FIG. 11 shows an example where the y-coordinates at the control points PB and PC are sequentially reduced—i.e., the curvature of the segmental curve is gradually decreased. Note that the "step" shown in FIG. 11 is a value obtained by "256/N". This corresponds to the step-number data n1, n2, . . . shown in FIG. 8. As shown in FIG. 11, when employing the aforementioned estimating expressions, it can be understood that the number of subdivisions decreases as the curvature of the segmental curve decreases.

It should be noted that the values of respective line segments are used as they are in the formula (3). Values obtained by squaring the lengths of these line segments may also be employed.

Next, a second method will be explained in conjunction with FIGS. 12 and 13.

Figure 12:
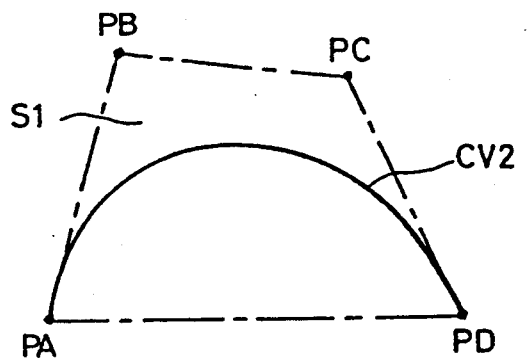
FIGS. 12 and 13 are explanatory diagrams showing a second method of obtaining the number of subdivisions of the segmental curve.

Referring to FIG. 12, the symbols PA and PD designate anchor points of a segmental curve CV2, while PB and PC indicate control points thereof. The symbol S1 is the area of a quadrangle shaped by sequentially connecting the points PA, PB, PC and PD with straight lines. Typically, the area S1 of the quadrangle increases with a larger curvature of the segmental curve CV2. Hence, the optimum subdividing number "N" of the segmental curve CV2 can be obtained by the following estimating expression.

$$N = 2^{\{log(a) \, S1\}} \quad (5)$$
$$2 \leq a \leq 8 \; (\text{``}a\text{'' is the base})$$

Note that the base "a" is adequately selected according to the approximate accuracy of the curve. The subdividing number "N" in the formula (5) is selected so as not to exceed the number of subdivisions ("256" in the example of FIG. 6) in the data table.

Figure 13:
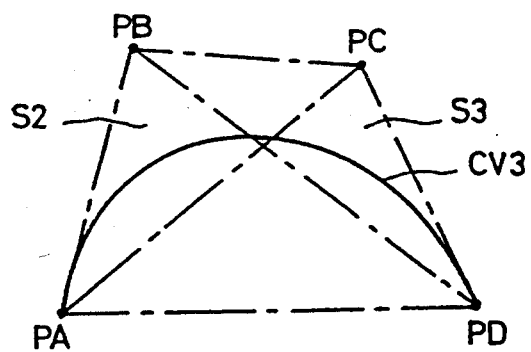

In FIG. 13, the symbols PA and PD denote anchor points of a segmental curve CV3, while PB and PC represent control points thereof. The symbol S2 indicates an area of a triangle shaped by sequentially connecting the points PA, PB and PD with straight lines. The symbol S3 is an area of a triangle shaped by sequentially connecting the points PA, PC and PD with straight lines.

A sum, given by "S2+S3", of the areas S2 and S3 of the triangles increments with the greater curvature of the segmental curve CV3. Therefore, the optimum subdividing number "N" can be obtained by the following estimating expression.

$$N = 2^{\{log(a) \, (S2+S3)\}} \quad (6)$$
$$2 \leq a \leq 8 \; (\text{``}a\text{'' is the base})$$

The base "a" is properly selected according to an approximate accuracy of the curve. The subdividing number "N" shown in the formula (6) is selected so as not to exceed the number of subdivisions ("256" in the example of FIG. 6) in the data table.

It is to be noted that the values of the areas are employed as they are in the formulae (5) and (6). Values obtaining by squaring these area may also be used.

Based on the first method of this invention, the difference between the value corresponding to the lengths of line segments sequentially connecting one anchor point, the control point and another anchor point with straight lines and the value corresponding to the length of line segment connecting the anchor points to each other with the straight line, is obtained. The number of subdivisions of the curve is obtained on the basis of a value corresponding to this difference, thus approximately expressing the curve. Based on the second method of this invention, the number of subdivisions of the curve is obtained on the basis of the areas of parts surrounded by straight lines connecting one anchor point, the control point and another anchor point. The curve is thus approximately expressed. Hence, the optimum number of subdivisions is obtained in accordance with the curve to be expressed. The time required for generating the outline font can consequently be reduced.

Although the present invention has been fully described by way of example with reference to the accompanying drawings, it is to be understood that various changes and modifications will be apparent to those skilled in the art. Therefore, unless otherwise such changes and modifications depart from the scope of the invention, they should be construed as being included therein.

What we claim is:

1. A method for producing an outline font by constructing a second curve approximately representing a first curve having first and second anchor points and at least one control point, comprising the steps of:

subdividing said first curve into a plurality of segments, and constructing said second curve by connecting adjacent subdividing points with straight lines, the improvement wherein said method comprises the steps of:

determining a first distance corresponding to a combination of lengths of line segments sequentially connecting said first anchor point to said at least one control point and then to said second anchor point, with straight lines, determining a second distance corresponding to the length of a line segment connecting said anchor points to one another with a straight line, determining the difference between said first and second distances, determining a number of subdivisions for said first curve as a function of said difference, subdividing said first curve into a plurality of subdivisions equal to said determined number, and constructing said second curve so as to produce said outline font by joining points corresponding to ends of said subdivisions with straight lines.

2. The method of claim 1 further comprising the step of storing said determined number in a memory, and wherein said step of constructing comprises the step of retrieving said determined number from said memory.

3. A method for producing an outline font by constructing a second curve approximately representing a first curve having first and second anchor points and at least one control point, comprising the steps of:

subdividing said first curve into a plurality of segments, and constructing a second curve by connecting adjacent subdividing points with straight lines, the improvement wherein said method comprises the steps of:

connecting said first anchor point, said at least one control point and said second anchor point with straight lines to surround at least one area, determining a number of subdivisions of said first curve as a function of said areas, subdividing said first curve into said determined number of subdivisions, and constructing said second curve so as to produce said outline font by joining points corresponding to ends of said determined number of subdivisions with straight lines.

4. The method of claim 3 further comprising the step of storing said determined number in a memory, and wherein said step of constructing comprises the step of retrieving said determined number from said memory.

5. A method for producing an outline font by constructing a second curve approximately representing a first curve having first and second curve segments each with first and second anchor points and at least one control point, comprising the steps of:

subdividing each curve segment into a plurality of line segments, and constructing said second curve by connecting adjacent subdividing points of said line segments with straight lines, said second curve segment having a lesser radius of curvature than said first curve segment, the improvement wherein said method comprises the steps of:

determining a first value corresponding to lengths of line segments sequentially connecting said first anchor point to said second anchor point via said at least one control point, with straight lines, for each of said curve segments, determining a second value corresponding to the length of a line segment directly connecting said anchor points to one another with a straight line, for each of said curve segments, obtaining a difference between said first and second values for each of said curve segments, determining a number of subdivisions for each of said first and second curve segments as a function of said difference for each said curve segment, said function increasing with increases in the curvature of the respective curve segment, subdividing said first and second curve segments into the respective determined number of subdivisions, and constructing said second curve so as to produce said outline font by joining points corresponding to ends of said determined number of subdivisions with straight lines.

6. The method of claim 5 wherein said step of subdividing said first and second curve segments comprises the step of subdividing said first curve segment into a greater number of subdivisions than said second curve segment.

7. A method for producing an outline font by constructing a second curve approximately representing a first curve having first and second curve segments each with first and second anchor points and at least one control point, comprising the steps of:

subdividing each of said curve segments into a plurality of segments, and constructing said second curve by connecting adjacent subdividing points with straight lines, said first curve segment having a radius of curvature smaller than that of said second curve segment, the improvement wherein said method comprises the steps of:

defining an area for each of said curve segments, by connecting the respective first and second anchor points and at least one control point with straight lines, determining a number of subdivisions of each of said first and second curve segments as a function of the respective defined area, said function increasing with increases in the curvature of the respective curve segment, subdividing said first and second curve segments into a plurality of subdivisions equal to the number determined for the first and second curve segments, respectively, and constructing said second curve so as to produce said outline font by joining points corresponding to ends of said determined number of subdivisions with straight lines.

8. The method of claim 7 wherein said step of subdividing said first and second curve segments comprises the step of subdividing said first curve segment into a greater number of subdivisions than said second curve segment.

9. An apparatus for generating a font of characters having outlines comprised of a plurality of straight lines, wherein the outlines of the characters correspond to curvilinear characters having curves subdivided into a plurality of curve segments each having first and second anchor points and at least one control point, said apparatus comprising:

means for determining coordinates of a plurality of points in each of said segments, and means for generating straight lines to join said points to define said outlines;

the improvement comprising:

means for:

determining a first length of a combination of lines sequentially connecting coordinates of said first anchor point to said at least one control point and then to said second anchor point, in each of said curve segments, determining a second length of a line connecting coordinates of said anchor points to one another in each of said curve segments, determining the difference between said first and second lengths, determining the coordinates of a plurality of points for each of said curve segments of a number which corresponds to said difference, a memory for storing said number for each of said segments, means for calculating the coordinates of each of said points, memory means for storing said coordinates of said points, and said means for generating straight lines comprises means for producing said outline font by generating straight lines joining points at said coordinates.

10. A method for producing an outline font by constructing a second curve approximately representing a first curve having first and second anchor points and at least one control point, comprising the steps of:

providing first signals corresponding to coordinates of said first and second anchor points and control point, providing second signals corresponding to coordinates of subdividing points of a plurality of subdivisions of said first curve, and constructing a second curve that represents said first curve so as to produce said outline font by generating third signals corresponding to straight line connections between the coordinates represented by said second signals, said step of constructing comprising the steps of:

determining a first length corresponding to a combination of lengths of line segments sequentially connecting said first anchor point to said at least one control point and then to said second anchor point, with straight lines, determining a second length corresponding to the length of a line segment connecting said anchor points to one another with a straight line, generating a fourth signal corresponding to the difference between the first and second lengths, determining a number of subdivisions for said first curve as a function of said fourth signal, and said step of providing second signals comprising the step of providing said second signals corresponding to the coordinates of a plurality of subdivisions equal to said determined number of subdivisions.

11. A method for producing an outline font by constructing a second curve approximately representing a first curve having first and second anchor points and at least one control point, comprising the steps of:

providing first signals corresponding to coordinates of said first and second anchor points and control point, providing second signals corresponding to coordinates of subdividing points of a plurality of subdivisions of said first curve, constructing a second curve that represents said first curve so as to produce said outline font by generating third signals corresponding to straight line connections between the coordinates represented by said second signals, said step of constructing comprising the steps of:

joining the coordinates of said first and second anchor points and said at least one control point with a line to surround at least one area, generating a fourth signal corresponding to said at least one area, and said step of providing second signals comprises the step of providing second signals corresponding to the coordinates of a number of subdivisions proportional to said at least one area.

12. An apparatus for generating an outline font of characters having outlines comprised of a plurality of straight lines, wherein the outlines of the characters correspond to curvilinear characters having curves subdivided into a plurality of curve segments each having first and second anchor points and at least one control point, said apparatus comprising:

a computer, a ROM having a program stored therein for controlling said computer, and a RAM connected to said computer for storing data related to said outlines, said ROM including:

means for controlling said computer to generate signals corresponding to coordinates of a plurality of points in each of said segments, and means for generating signals corresponding to straight lines to join said points to define said outlines and thereby to produce said outline font, said ROM further being connected to control said computer to store numbers in said RAM corresponding to a difference between the length of a first line sequentially connecting coordinates of said first anchor point to said control point and then to said second anchor point and the length of a second line connecting coordinates of said anchor points to one another in each of said curve segments, said means for controlling said computer to generate signals corresponding to coordinates of a plurality of points comprising means for controlling said computer to generate signals corresponding to coordinates of a number of curve subdivisions corresponding to the number stored in said RAM for the respective curve segment.

13. The apparatus of claim 12 wherein said RAM has signals stored therein corresponding to said coordinates of said plurality of points, as well as address pointers for addressing said numbers.

14. An apparatus for generating an outline font of characters having outlines comprised of a plurality of straight lines, wherein the outlines of characters correspond to curvilinear characters having curves subdivided into a plurality of curve segments each having first and second anchor points and at least one control point, said apparatus comprising:

a computer, a ROM having a program stored therein for controlling said computer, and a RAM connected to said computer for storing data related to said outlines, said ROM including:

means for controlling said computer to generate signals corresponding to coordinates of a plurality of points in each of said segments, and means for generating signals corresponding to straight lines to join said points to define said outlines and thereby to produce said outline font, said ROM further being connected to control said computer to store numbers in said RAM corresponding to an area defined by a line joining coordinates of said first and second anchor points and said control point, said means for controlling said computer to generate signals corresponding to coordinates of a plurality of points comprising means for controlling said computer to generate signals corresponding to coordinates of a number of curve subdivisions corresponding to the number stored in said RAM for the respective curve segment.

15. The apparatus of claim 14 wherein said RAM has signals stored therein corresponding to said coordinates of said plurality of points, as well as address pointers for addressing said numbers.

16. An apparatus for generating an outline font of characters having outlines comprised of a plurality of straight lines, wherein the outlines of the characters correspond to curvilinear characters having curves subdivided into a plurality of curve segments each having first and second anchor points and at least one control point, said apparatus comprising:

means for determining coordinates of a plurality of points in each of said segments, and means for generating straight lines to join said points to define said outlines and thereby to produce said outline font, the improvement comprising:

means for determining the coordinates of a plurality of points for each of said curve segments of a number which corresponds to an area defined by a line joining coordinates of said first and second anchor points and said control point, memory means for storing said number for each of said segments, means for calculating the coordinates of each of said points, and memory means for storing said coordinates of said points, and said means for generating straight lines comprises means for generating straight lines joining points at said coordinates.

* * * * *